US010851476B2

(12) United States Patent
Berkemann et al.

(10) Patent No.: US 10,851,476 B2
(45) Date of Patent: Dec. 1, 2020

(54) METHOD FOR PRODUCING A PLEATABLE TEXTILE FABRIC WITH ELECTROSTATICALLY CHARGED FIBERS

(71) Applicant: Groz-Beckert KG, Albstadt (DE)

(72) Inventors: Ralph Berkemann, Tailfingen (DE); Fabian Stauss, Hechingen (DE); Frank Endriss, Raleigh, NC (US); Andreas Tulke, Albstadt (DE)

(73) Assignee: Groz-Beckert KG, Albstadt (DE)

( * ) Notice: Subject to any disclaimer, the term of this patent is extended or adjusted under 35 U.S.C. 154(b) by 0 days.

(21) Appl. No.: 16/339,629

(22) PCT Filed: Oct. 6, 2017

(86) PCT No.: PCT/DE2017/100849
§ 371 (c)(1),
(2) Date: Apr. 4, 2019

(87) PCT Pub. No.: WO2018/065014
PCT Pub. Date: Apr. 12, 2018

(65) Prior Publication Data
US 2019/0338446 A1    Nov. 7, 2019

(30) Foreign Application Priority Data
Oct. 6, 2016   (DE) .................. 10 2016 118 966

(51) Int. Cl.
*D01D 7/00*   (2006.01)
*D01F 6/06*   (2006.01)
(Continued)

(52) U.S. Cl.
CPC ....... *D01D 5/0985* (2013.01); *B01D 39/1623* (2013.01); *D01D 5/082* (2013.01);
(Continued)

(58) Field of Classification Search
CPC ..... D01F 1/10; D01F 6/04; D01F 6/06; D01F 6/12; D01F 6/16; D04H 3/007;
(Continued)

(56) References Cited

U.S. PATENT DOCUMENTS 5,726,107 A    3/1998 Dahringer et al.
6,171,684 B1*  1/2001 Kahlbaugh ............ B01D 27/06
                                                    428/212
(Continued)

FOREIGN PATENT DOCUMENTS

CN    101495209 A   7/2009
CN    102112680 A   6/2011
(Continued)

OTHER PUBLICATIONS

International Search Report dated Jan. 25, 2018, for International Application No. PCT/DE2017/100849 (11 pages).
(Continued)

*Primary Examiner* — Leo B Tentoni
(74) *Attorney, Agent, or Firm* — Fitch, Even, Tabin & Flannery LLP

(57) ABSTRACT

A method for producing a pleatable textile object having electrostatically charged fibres, and to a pleatable textile object is described. At least two separate dies are used, one for the production of finer fibres and one for the production of coarser fibres, using a melt spinning process. At least the first die, which is used to produce the coarser fibres, has concentric orifices. The finer and coarser fibres are mixed at least in sections during the process and are also charged electrostatically with the aid of a polar liquid. The textile object can be used to make filters with a quality factor in excess of 0.2.

11 Claims, 12 Drawing Sheets

(51) Int. Cl.

| | | |
|---|---|---|
| *D01F 6/12* | (2006.01) |
| *D01F 6/16* | (2006.01) |
| *D04H 3/007* | (2012.01) |
| *D04H 3/009* | (2012.01) |
| *D04H 3/011* | (2012.01) |
| *D04H 5/00* | (2012.01) |
| *D06M 11/05* | (2006.01) |
| *D01D 5/098* | (2006.01) |
| *B01D 39/16* | (2006.01) |
| *D01D 10/04* | (2006.01) |
| *D01F 1/10* | (2006.01) |
| *D01F 6/04* | (2006.01) |
| *D04H 1/42* | (2012.01) |
| *D01D 5/08* | (2006.01) |

(52) U.S. Cl.
CPC ........... *D01D 10/0472* (2013.01); *D01F 1/10* (2013.01); *D01F 6/04* (2013.01); *D04H 1/42* (2013.01); *B01D 2239/0435* (2013.01); *B01D 2239/0622* (2013.01); *B01D 2239/10* (2013.01); *D10B 2505/04* (2013.01)

(58) Field of Classification Search
CPC .......... D04H 3/009; D04H 3/011; D04H 5/00; D06M 11/05; D10B 2505/04; D01D 5/082; D01D 5/0985; D01D 7/00
USPC ... 264/103, 171.1, 211.12, 211.14, 436, 484, 264/518, 555; 156/181
See application file for complete search history.

(56) References Cited

U.S. PATENT DOCUMENTS

| | | | |
|---|---|---|---|
| 7,754,041 B2 | 7/2010 | Fox et al. | |
| 8,372,175 B2 | 2/2013 | Fox | |
| 2002/0110610 A1 | 8/2002 | Angadjivand et al. | |
| 2006/0079145 A1* | 4/2006 | Cox .................. | B01D 39/1623 264/103 X |
| 2007/0055015 A1 | 3/2007 | Flood et al. | |
| 2008/0022643 A1 | 1/2008 | Fox et al. | |
| 2008/0026659 A1 | 1/2008 | Brandner et al. | |
| 2008/0318024 A1 | 12/2008 | Angadjivand et al. | |
| 2009/0293279 A1 | 12/2009 | Sebastian et al. | |
| 2010/0285101 A1 | 11/2010 | Moore et al. | |
| 2013/0288555 A1 | 10/2013 | Berkemann et al. | |
| 2016/0023147 A1 | 1/2016 | Takebe et al. | |
| 2016/0298266 A1* | 10/2016 | Zillig ................ | D01D 5/0985 |
| 2017/0137970 A1* | 5/2017 | Pourdeyhimi ......... | D01D 5/082 |

FOREIGN PATENT DOCUMENTS

| | | |
|---|---|---|
| CN | 103348048 A | 10/2013 |
| DE | 102006013170 A1 | 9/2007 |
| EP | 0705931 A1 | 4/1996 |
| EP | 2609238 B1 | 12/2016 |
| JP | 5-9611 A | 1/1993 |
| JP | 8-74163 A | 3/1996 |
| JP | 2003-511577 A | 3/2003 |
| JP | 2009-545440 A | 12/2009 |
| JP | 2011-522137 A | 7/2011 |
| JP | 2014-176775 A | 9/2014 |
| JP | 2015-7303 A | 1/2015 |
| KR | 20080033505 A | 4/2008 |
| KR | 20090038442 A | 4/2009 |
| KR | 20100024986 A | 3/2010 |
| KR | 20160085151 A | 7/2016 |
| WO | 2015/195648 A2 | 12/2015 |
| WO | 2015195648 A2 | 12/2015 |

OTHER PUBLICATIONS

International Preliminary Report on Patentability dated Oct. 22, 2018, for International Application No. PCT/DE2017/100849 (13 pages).
Canadian Requisition by the Examiner and Examination Search Report dated Apr. 12, 2019, in corresponding Canadian Patent Application No. 3,036,734 (4 pgs.).
Japanese Notice of Reason for Rejection, dated Aug. 29, 2019, in corresponding Japanese Patent Application No. 2019-518399, with English Translation (6 pages).
Korean Notice of Preliminary Rejection, dated Aug. 29, 2019, in corresponding Korean Patent Application No. 10-2019-7013021, with English translation (21 pages).
Chinese First Office Action dated Aug. 26, 2019 and Search Report dated Aug. 16, 2019, in corresponding Chinese Patent Application No. 201780061973.8, with machine English translation (21 pgs.).
Korean Notice of Final Rejection dated May 26, 2020, in corresponding Korean Application No. 10-2019-7013021, with English translation (11 pages).
Korean Notice of Final Rejection dated Feb. 27, 2020, in corresponding Korean Application No. 10-2019-7013021, with English translation (11 pages).
Japanese Second Office Action dated Feb. 27, 2020, in corresponding Japanese Application No. 2019-518399, with English translation (7 pages).
European Communication pursuant to Article 94(3) EPC dated Apr. 2, 2020, in corresponding European Application No. 17808753.2, with machine English translation (8 pages).
Chinese Second Office Action dated Mar. 19, 2020, in corresponding Chinese Application No. 201780061973.8, with machine English translation (14 pages).
Japanese Office Action dated Jul. 22, 2020, in corresponding Japanese Application No. 2019-518399, with English translation (8 pages).
Chinese Third Office Action dated Aug. 24, 2020, in corresponding Chinese Application No. 201780061973.8, with English translation (8 pages).

* cited by examiner

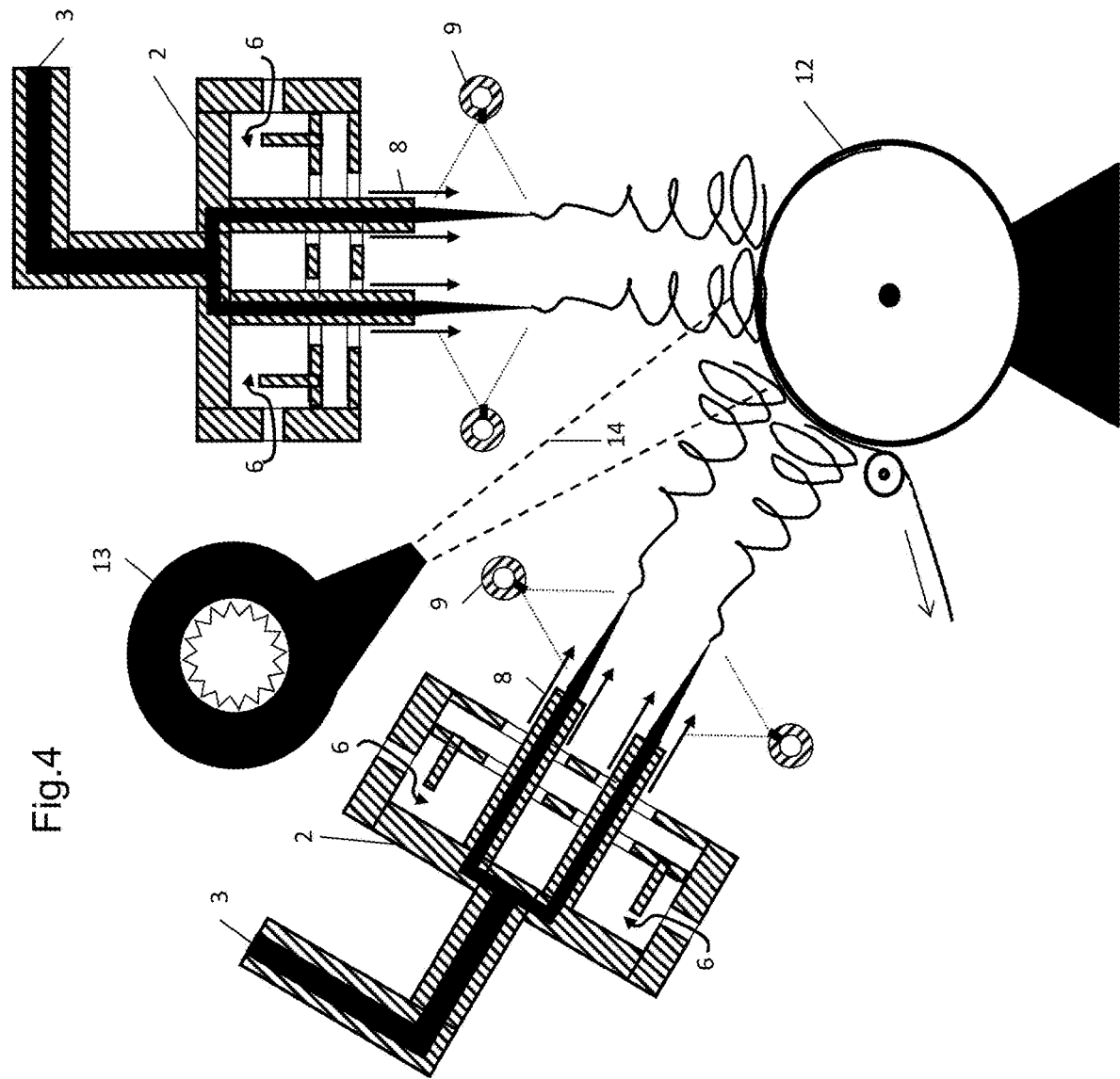

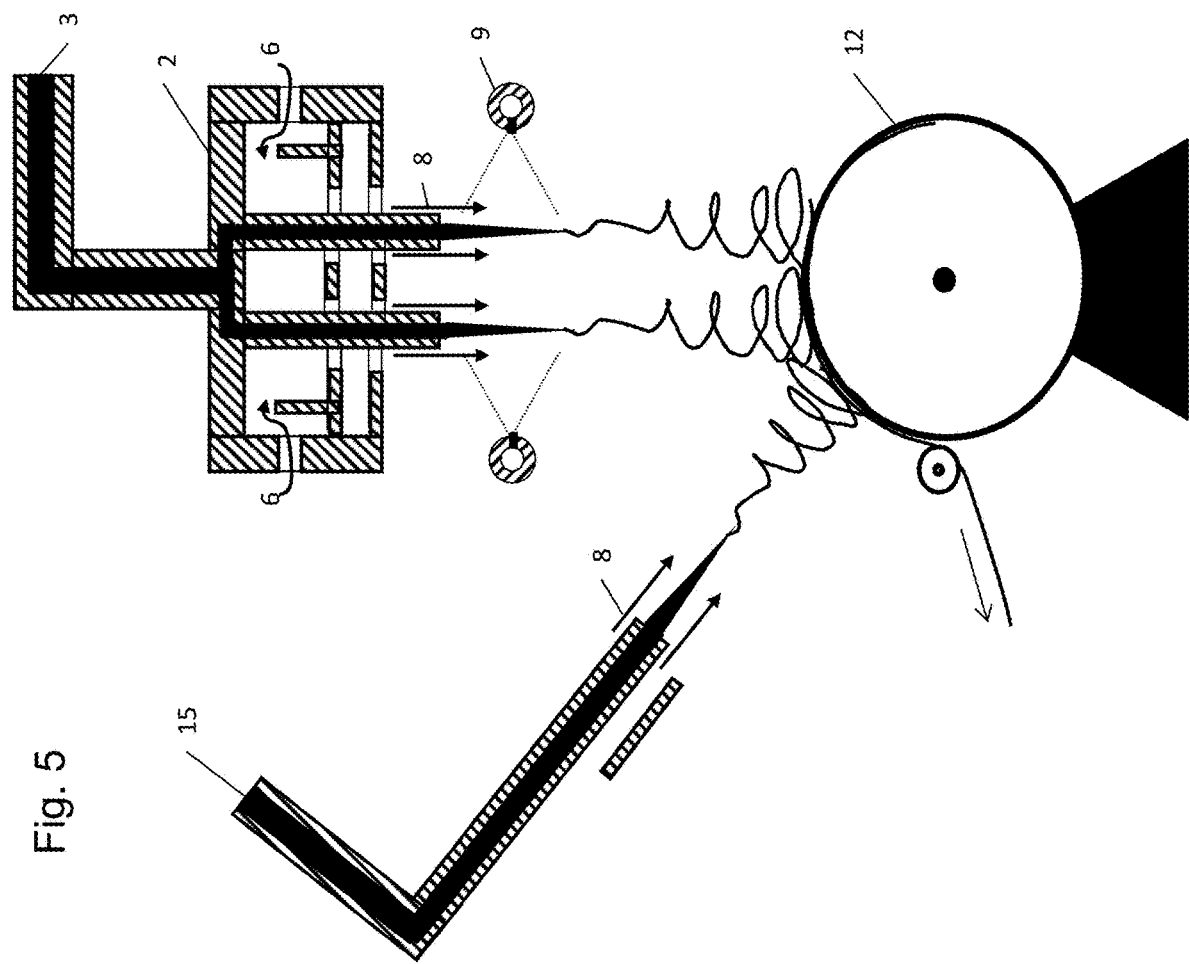

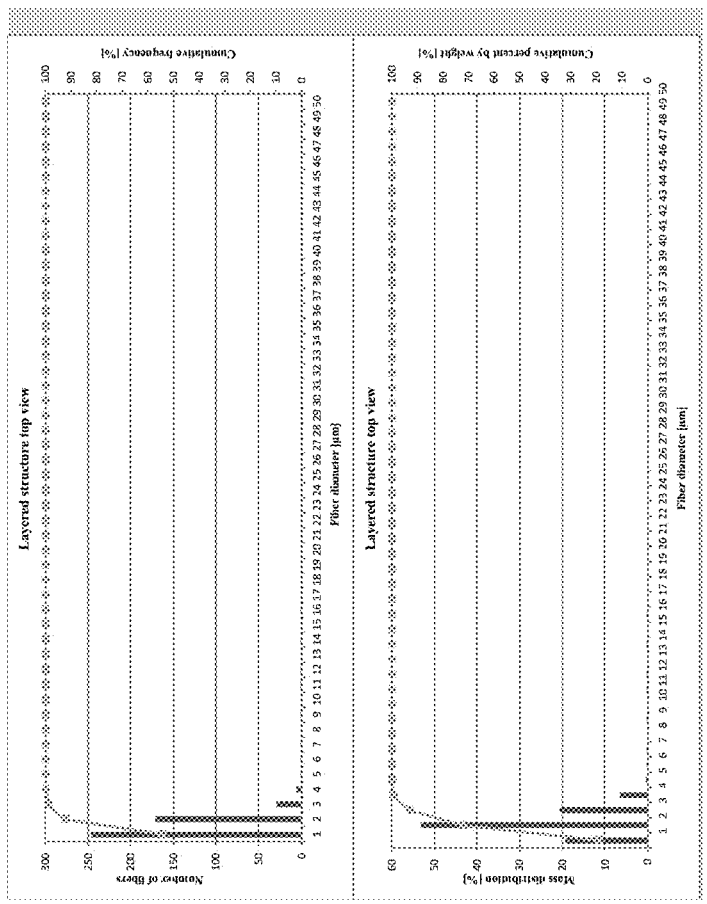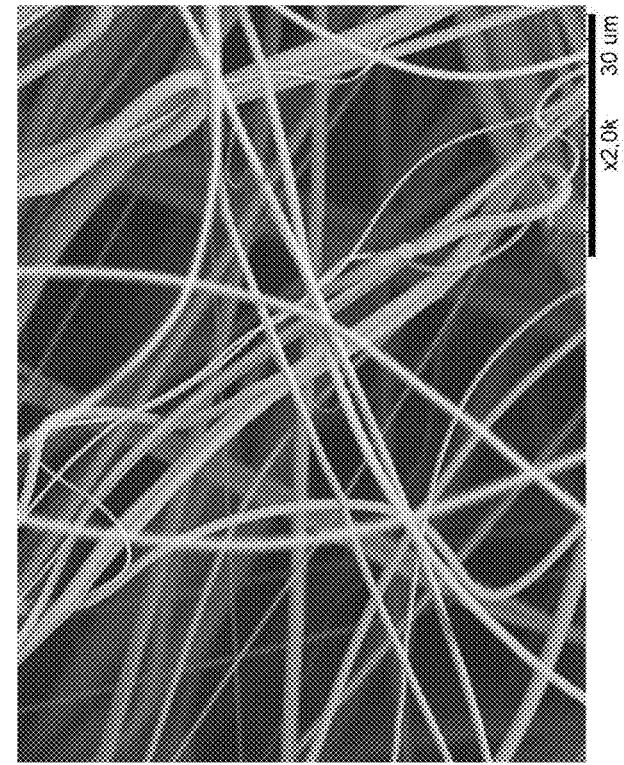
Fig. 9

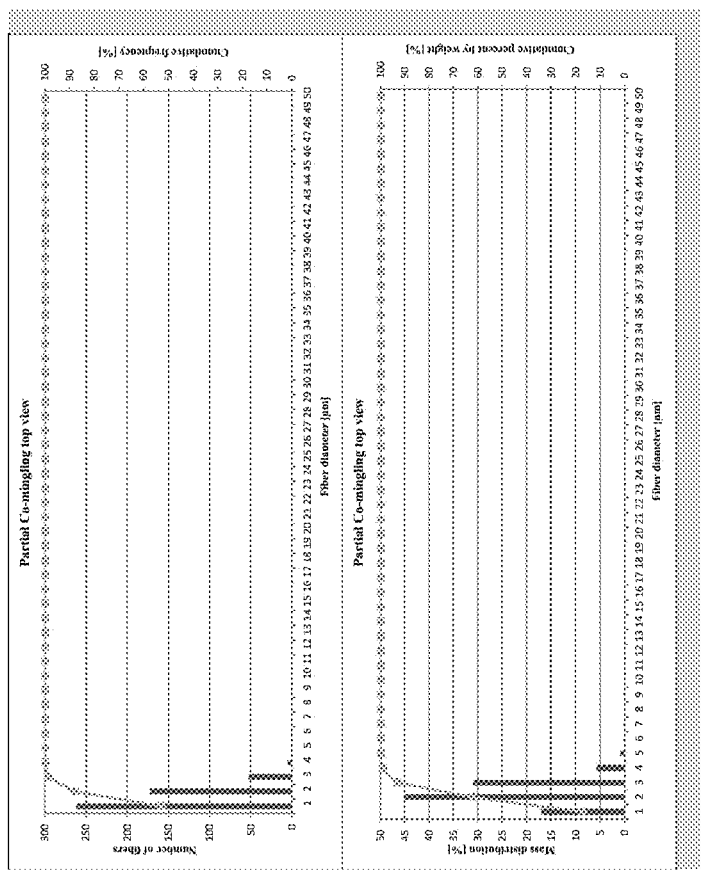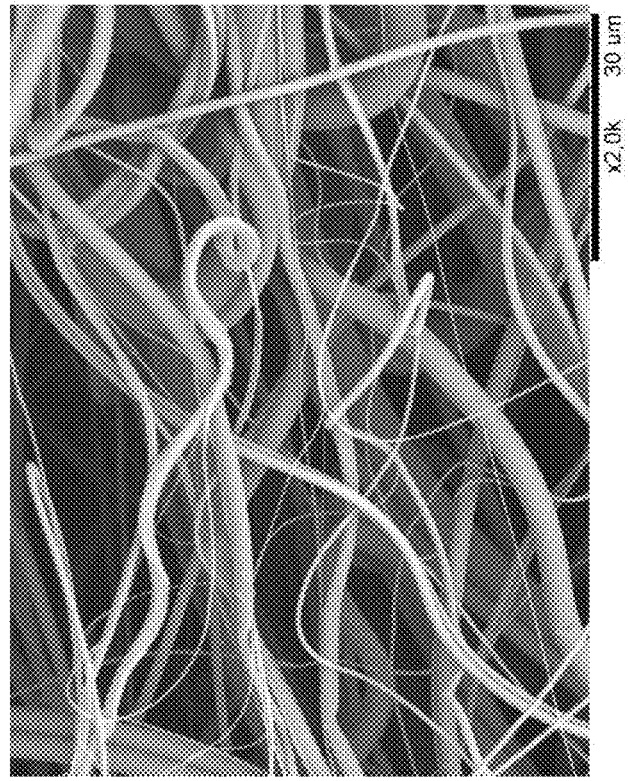
Fig. 11

METHOD FOR PRODUCING A PLEATABLE TEXTILE FABRIC WITH ELECTROSTATICALLY CHARGED FIBERS

CROSS REFERENCE TO RELATED APPLICATIONS

This patent application is the national phase of PCT/DE2017/100849, filed Oct. 6, 2017, which claims the benefit of German Patent Application 102016118966.9, filed Oct. 6, 2016.

TECHNICAL FIELD

The invention relates to a method for manufacturing a pleatable textile object having electrostatically charged fibres, and to a pleatable textile object preferably manufactured by way of the method according to the invention. The textile object is used mainly as depth-filter material. Filters in which such depth-filter material is used are usually characterised by very good filtration properties.

BACKGROUND

From the prior art, particularly from the field of filtration technology, bimodal nonwovens, as they are termed, which consist of two fibre types that are co-mingled at least zonally, are already known. The two fibre types differ in their average diameters, i.e. the bimodal nonwoven consists of coarse and fine fibres which are intensively co-mingled at least zonally.

Where a bimodal nonwoven of this kind is used as filter material, the finer fibres serve to filter out particularly the finer particles, i.e. to enhance the filtration efficiency with respect to finer particles. The coarse fibres serve, firstly, to filter out coarser particles and, secondly, to impart sufficient mechanical stability to the bimodal nonwoven. This arrangement also ensures that in a nonwoven of this kind, the finer fibres are sufficiently spaced apart from each other on account of their being mixed with coarse fibres. In a nonwoven consisting exclusively of finer fibres, the fine fibres would be too close together, i.e. when used in a filter, a nonwoven of this kind would cause too great a pressure drop and the filter would always block very quickly when filtering dust or a particle-containing medium.

The US 2008/0026659 A1 describes the production of a bimodal nonwoven using a single die having orifices with different capillary diameters. On account of the function principle of such a die, it is only possible to produce bimodal nonwovens whose coarser and finer fibres do not differ much in respect of their average diameters. Furthermore, all the orifices are arranged in a single row across the width of the die used. In consequence, the two fibre types always occur from the die at largely the same position and parallel to one another. In practice, therefore, it is impossible to influence co-mingling of the two fibre types.

U.S. Pat. No. 8,372,175 B2 discloses a method for producing a filter material, in which coarser fibres are produced by means of a spunbonding process and finer fibres by means of a meltblown process and the two fibre types co-mingle during the production process. Following production of the nonwoven, its fibres may be electrostatically charged, e.g. by means of corona discharge or what is known as hydrocharging. The customary low filament speeds characteristic of spunbonding processes differ distinctly from the high filament speeds typical of meltblown processes, i.e. the filament speeds differ strongly from one another. Furthermore, the sizeable air speeds in the meltblown process can have a considerable negative influence on the filament array. Very strong turbulence is therefore likely to occur during fibre co-mingling, preventing the production of high-quality, uniform nonwoven fabrics with this method.

Dies with a linear arrangement of orifices, also referred to as Exxon-type orifices, are known (hereinafter: Exxon dies). Dies which have concentrically arranged orifices are also known (hereinafter: dies with concentric orifices). Biax dies (named after the manufacturer) have a special configuration of concentric orifices.

In DE 10 2006 013 170 A1, a method for producing a bimodal nonwoven by means of two Exxon dies is described, in which the finer fibres are produced with the one die and the coarser fibres with the other die. However, there is no suggestion of charging the fibres electrically during the process, nor of using different polymer types for the finer and coarser fibres.

WO 2015/195648 A2 describes a method for producing a bimodal nonwoven, in which the coarse fibres are produced with a die having concentric nozzles and the fine fibres with another die, which may have either Exxon-type or concentric orifices. Electric charging of the fibres in the bimodal nonwoven is not contemplated here either.

Methods are known, additionally, with which the fibres in filter materials may be electrostatically charged. Charging the fibres electrostatically can significantly improve the filtration efficiency of filtration materials, in particular with regard to fine particles. This is because particles that merely come near to electrostatically charged fibres can be attracted by their electric field and consequently held back by the filter, whereas the particles in question would not have been held back in the case of an uncharged fibre. The mechanical filtration principle according to which fine particles can only be filtered out by means of fine fibres accordingly needs amending: fine particles can also be filtered out by means of electrically charged coarse fibres.

One known method is to charge the fibres by means of corona discharge. However, the currently known methods using a corona discharge do not permit very potent/effective electrostatic charging of the fibres.

According to another method, fibres are charged with the help of the Lenard effect (Hydrocharging; see EP 2 609 238 B1), using electrically charged water droplets.

SUMMARY

The aim of the invention accordingly consists in finding a method with which pleatable textile objects may be produced in a single step, preferably for use as filter material for an electret filter, having a layered structure and/or a gradually changing fibre-diameter size. The intention is to impart semipermanent electrostatic charges to the fibres.

The method of producing triboelectrically charged textile objects is carried out using an orifice configuration involving at least two separate dies. The method is preferably carried out with precisely two dies, but three or more dies may be used for special applications.

As a rule, a meltblown spinning process (melt spinning process) known from the prior art, e.g. also a Spun-Blown® spinning process, is carried out with the dies. The first die always has concentric orifices, e.g. of the Biax type. As the second die (and maybe a third/additional die(s)), use may be made optionally of a die with a linear arrangement of orifices (Exxon-type) or concentric orifices, e.g. of the Biax-type.

During meltblown spinning processes (melt blowing), a polymer melt is forced through the capillary openings of a die. As the polymer exits from the capillary openings, it is caught up in a stream of gas, usually an air stream, moving at very high speed. The exiting polymer is dragged from a gas stream and drawn to polymer fibres with substantially smaller diameters than the diameters of the associated capillary openings/capillaries. Melt blowing produces relatively long thread lengths (i.e. relatively long fibres). However, compared with spunbonding processes, considerably more filament breaks may occur.

To carry out the method, the melt of a first polymer is extruded to form fibres of a first fibre type with the aid of the first die. With the aid of a second die, the melt of a second polymer is extruded by means of a meltblown spinning process to form fibres of a second fibre type. Where required, a third polymer is extruded to form fibres of a third fibre type by means of a third die. Fibres of further fibre types may be extruded by means of additional dies.

The textile object according to the invention is shaped from the fibres of all the fibre types, at least, however, from the fibres of the first fibre type and the fibres of the second fibre type, by means of a collecting device. The process parameters are selected such that the fibres of the first fibre type have a larger average fibre diameter than the fibres of the second fibre type.

According to the invention, the fibres of the first fibre type co-mingle with the fibres of the second fibre type, at least in sections, before or during shaping of the textile object by means of the collecting device. In addition, at least during thread formation and/or during drawing, the fibres of the first fibre type and/or the fibres of the second fibre type are treated with a polar liquid (preferably with water in the form of fine droplets).

The method of the invention makes it possible to produce textile objects in a single-step process, which have a layer-like structure and/or gradually changing (i.e. continuously graded) proportions of coarser and finer fibres. In addition, the fibres may be potently/effectively electrostatically charged. Since dies with concentric orifices, e.g. of the Biax type, are used for production of the coarser fibres, the coarser fibres may have even larger diameters than would be the case if Exxon dies were used.

The pleatable textile object of the invention accordingly consists of fibres produced by way of a melt spinning process. The fibres are made up of a first fibre type consisting of fibres of a first polymer, and a second fibre type consisting of fibres of a second polymer. The average diameter of the fibres of the first fibre type is larger than the average diameter of the second fibre type. At least in a partial volume of the textile object, the proportions of fibres of the first fibre type and of fibres of the second fibre type show a gradient (are graded) over the cross section of the textile fabric. At least some of the fibres of the first and/or of the second fibre type are electrostatically charged.

Use of the textile object as filter material enables the production of improved filters showing high filtration efficiency and high particle-holding capacity (high dust-holding capacity in the case of air filters). In addition, the diameter of the coarser fibres may be selected to be of a size large enough to enable the filter material (nonwoven material) to be used without substrates, e.g. spunbonded nonwovens. In particular, quality factors in excess of 0.2 are achievable. The quality factor QF is defined as $$QF = (-\ln(NaCl\ \%\ \text{penetration}/100))/\text{pressure drop in mmH}_2\text{O}$$

The exact value of "NaCl % penetration" (penetration factor of an uncharged filter) and also of the pressure drop may be measured with a TSI model 8130 filter tester at a flow-through speed of 0.1 m/s, using a 2% NaCl solution.

The collecting device is preferably a transport belt or a transport drum equipped with a suction means. The fibres of the first and of the second fibre type are sucked by the suction means of the transport belt or transport drum and deposited together on the transport belt/drum.

The textile object comprising the fibres of the first fibre type and the fibres of the second fibre type are generally shaped by means of the collecting device in such a way that co-mingling of the two fibre types takes place before and/or during collection of the fibres, e.g. by depositing them on a collecting belt or a collecting drum. The textile object is shaped by collection of the fibres. In the finished textile object, the fibres of the first fibre type are co-mingled, at least in sections, with the fibres of the second fibre type. The section may be so small, however, that virtually two (or three or more in cases where three or more dies are used) discrete layers exist, which are only held together by a very thin co-mingling zone.

Preferably, the process parameters, e.g. the angle between the spinning directions of the first and the second die or the way in which the dies and the collecting device are otherwise spatially arranged, are selected such that, at least in a portion of the textile object produced, the proportions of fibres of the first fibre type and of the second fibre type are graded. This portion preferably extends over at least 50%, 90% or 98% of the volume of the textile object.

If the textile object is a nonwoven intended for use as depth filter material for an electrostatically charged filter medium, the gradient is preferably designed such that, on the side of the nonwoven which, in the filter, is intended for the upstream flow side, the proportion of coarser fibres is higher than the proportion of finer fibres, and, on the side intended for the clean air side, the proportion of finer fibres is higher than the proportion of coarser fibres. With this arrangement, a large proportion of coarse particles is already retained in the coarse-fibre zone while the finer particles are retained predominantly in the zones in which the proportion of finer fibres is relatively high. This ensures that zones in which the proportion of finer fibres is relatively high are not quickly blocked with coarse particles. Thanks to the graded distribution of fibre-diameter size, interfaces with large differences in fibre diameter, at which particles tend to accumulate and ultimately cause blockages, are avoided. In consequence, almost the entire cross section of the structure is used for filtration.

If a nonwoven according to the invention is used for the production of a pleated filter, a manufacturer will be able to select, as depth filter material, a thinner nonwoven which, however, has the same particle- or dust-holding capacity as a thicker, conventionally manufactured nonwoven. In the case of pleated filters, the folds or crests of the pleats do not contribute to filtration or do so only minimally. Consequently, the filtration effect of filters made from the thin nonwovens according to the invention is better than that of filters made from thicker nonwovens. This is because the surface area of the fold/crest of the pleats, which is ineffective for filtration, is smaller in the case of thinner nonwovens than in the case of thicker nonwovens.

The fibres of the first fibre type, i.e. the coarser fibres, are preferably spun so that the average value of the fibre diameter is greater than 10 µm, greater than 15 µm, greater than 25 µm or greater than 50 µm. The average value of the fibre diameters may lie in a range from e.g. 2 µm to 200 µm, 5 μm to 60 μm or 10 μm to 30 μm The average value of the fibre diameters is preferably in the range from 5 μm to 60 μm.

The fibres of the second fibre type, i.e. the finer fibres, are preferably extruded such that the average value of the fibre diameter is less than 11 μm, less than 5 μm or less than 3 μm. The finest fibres of the second fibre type may have minimum diameters as small as 20 nm.

It is intended that the average diameters of the two fibre types be far enough apart for the two maxima to be distinctly recognizable in the overall distribution of fibre diameters. A fibre distribution of this kind is referred to as a "bimodal fibre distribution".

In order to obtain a bimodal fibre-diameter distribution of this kind, use may be made of a first die, which has orifices with a diameter ranging from 500 to 850 micrometers, and of a second die, which has orifices with a diameter ranging from 100 to 500 micrometers.

For carrying out the method of the invention, it proved of value generally to select (as first and second polymer for the fibres of the first and second fibre types) polymers that have melt flow indices (hereinafter: MFI) lower than 1000, lower than 500 or lower than 300. The MFI should, if possible, be determined as per ISO 1133. Otherwise, it should be determined as per ASTM D1238. The table below lists further standard conditions for various polymers. If neither of the two standards nor the table contain standard parameters for determining the MFI of the polymer in question, reference should be made to existing tables such as the DIN paperback "Thermoplastische Formmassen" (thermoplastic moulding materials) the CAMPUS database or the spec sheets supplied by the manufacturer of the particular polymer. Since a plurality of parameter sets, in particular a plurality of test temperatures and/or test loads, are often listed for determining the MFI of one and the same polymer, the parameter set with the highest temperature should always be selected in such a case, and maybe the parameter set which, in addition to the highest temperature, also lists the highest test load.

TABLE 1

Standard parameters for measuring the MFIs of various polymers

| Test temperature/°C | Test load/kg | | | | | | |
|---|---|---|---|---|---|---|---|
| | 0.325 | 1.2 | 2.16 | 3.8 | 5 | 10 | 21.6 |
| 125 | EVA | | | | | | |
| 150 | | EVA | | | | | |
| 190 | | PE EVA POM | | PE PP | | | PE WPC |
| 200 | | | | PS | | | |
| 220 | | | | | | ABS SAN ASA | |
| 230 | | | PP | PMMA | PP PVDF | | |
| 235 | | | PA-12 PA-11 | | PA-12 PA-11 | PA-11 | |
| 250 | | | PBT | | | | |
| 260 | | | PBT | | PMP PA | PMMI | |
| 275 | | | | | | | |
| 280 | | PPE/PS | PET PPE/PS | PPE/PS | PPE/PS | | |
| 300 | | PC | PPE/PS | | PA-GF PPE/PS | PPE/PS | |
| 315 | | | | | PPS | | |
| 330 | | | PC | | | PA6T | |
| 340 | | | PC | | | PEI | |
| 343 | | | PSU | | | | |
| 360 | | | | | | | PES PPSU PSU |
| 400 | | | PES PPSU PEEK | | | | |

Polypropylene (PP), polycarbonate (PC), polyactide (PLA), polyamide (PA) or blends of these polymers may be used advantageously as first polymer. As second polymer, it is preferable to use polypropylene (PP), polyethylene (PE), polycarbonate (PC), polyactide (PLA), polyamide (PA), polybutylene terephthalate (PBT), polyethylene terephthalate (PET), polyvinylidene fluoride (PVDF) or blends of these polymers.

Particularly intensive and long-lasting static charging may be achieved by using, as first and/or as second polymer, a polymer containing at least one additive that is able to bind free radicals, i.e. a so-called free-radical scavenger. As free-radical scavenger, use may be made, e.g. of a substance from the group of sterically hindered amines (HALS: Hindered-Amine Light Stabilizers), e.g. the amine known by its trade name Chimasorb® 944. As an alternative to the HALS, substances from the group of piserazines or from the group of oxazolidones may also be used.

It also proved of value to use a first polymer and/or a second polymer that contains at least one additive, for example a substance from the group of stearamides, that may act as internal slip agent (migration aid). Ethylene distearamide (generally known as ethylene bis(stearamide) (EBS) and also by the trade name Crodamide® EBS), proved particularly suitable.

It is preferable to use polymers containing at least one of the above-mentioned additives that can act as free-radical scavenger and simultaneously at least one of the additives described above that can act as internal slip agent. These additives were observed to be particularly effective in combination with polypropylene.

The substances acting as free-radical scavengers are able to bind electrostatic charges for a comparatively long period of time. The effect of the internal slip agents is that substances that are able to bind charges in the long term, when contained in a molten polymer, are able to move more easily to the surface of the polymer. Since electrostatic charging always occurs at the surface, a larger proportion of these substances is available for binding the electrostatic charges. The substances in question have practically no effect if they are in the interior of the polymer (of the polymer fibre).

Additionally, a first polymer and/or a second polymer may be used which contains at least a further additive such as a ferroelectric ceramics material (e.g. barium titanate), which is able, e.g. physically, to bind additional charges, or, alternatively, which contains a further additive, which is suitable for preventing charges already present on the fibres concerned from being released again (i.e. which practically protects the existing charges). Fluorochemicals may be used to advantage for this purpose, e.g. fluorine-containing oxazolidinone, fluorine-containing piperazine or a stearate ester of perfluorinated alcohols.

To further improve the filter, super-fine fibres (i.e. fibres with an average fibre diameter of less than 1 micrometer) may be added to the fibres of the first fibre type and/or to the fibres of the second fibre type. Alternatively or in addition, staple fibres may be added to the fibres of the first fibre type and/or to the fibres of the second fibre type, e.g. by means of a Rando Webber, or particles such as particles of activated charcoal, e.g. by means of a strewing trough or chute.

These additions are effected in the method according to the invention before and/or during shaping of the textile fabric in the collecting device. The super-fine fibres are usually added not as finished fibres/particles but by means of a separate spinning unit, e.g. by means of a solution blowing spinning unit, which generates the super-fine fibres directly before they are added.

BRIEF DESCRIPTION OF THE DRAWINGS

The invention is explained in more detail below on the basis of embodiments. The drawing in FIG. 1 is a schematic view showing the structure of a melt-blowing facility having a Biax die of single-row configuration.

FIG. 4 is a schematic view showing the structure of a melt-blowing facility with a die arrangement consisting of two Biax dies.

FIG. 5 is a schematic view showing the structure of a facility having a Biax die and a solution-blowing spinning unit.

FIG. 9 shows a SEM image and the corresponding fibre distributions of the top side of a layered fibrous fleece.

FIG. 11 shows a SEM image and the corresponding fibre distributions of the top side of a fibrous fleece having partial co-mingling.

DETAILED DESCRIPTION

Figure 1:
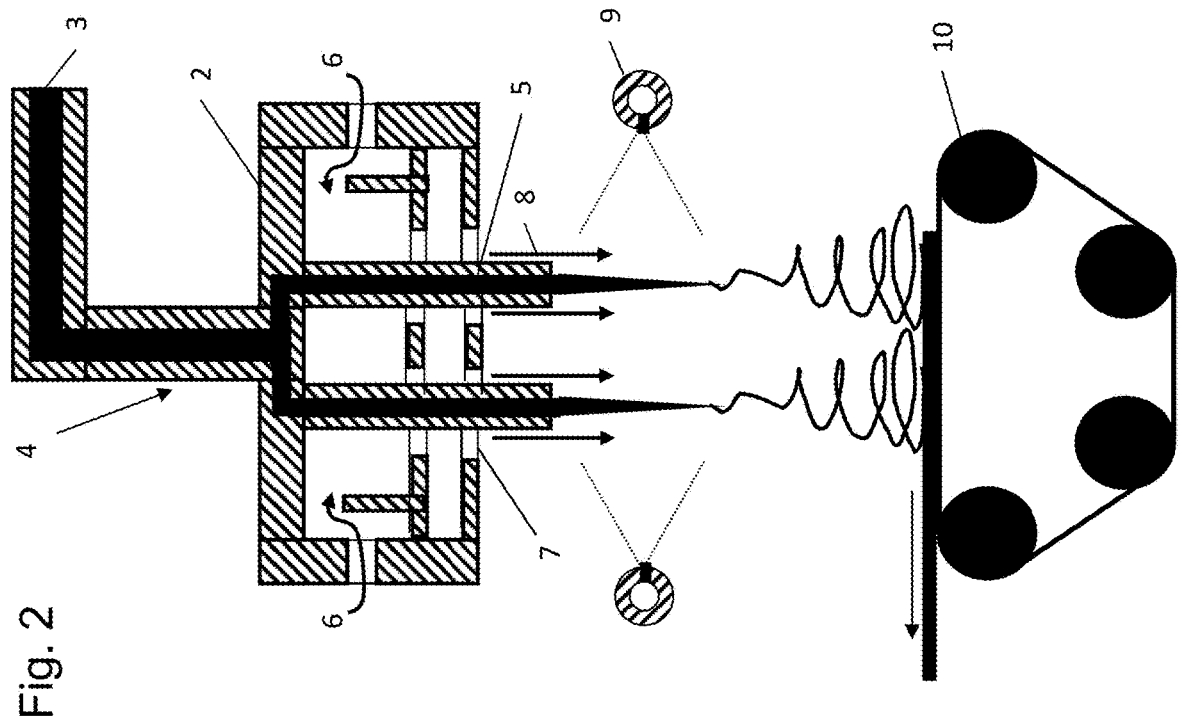
Figure 2:
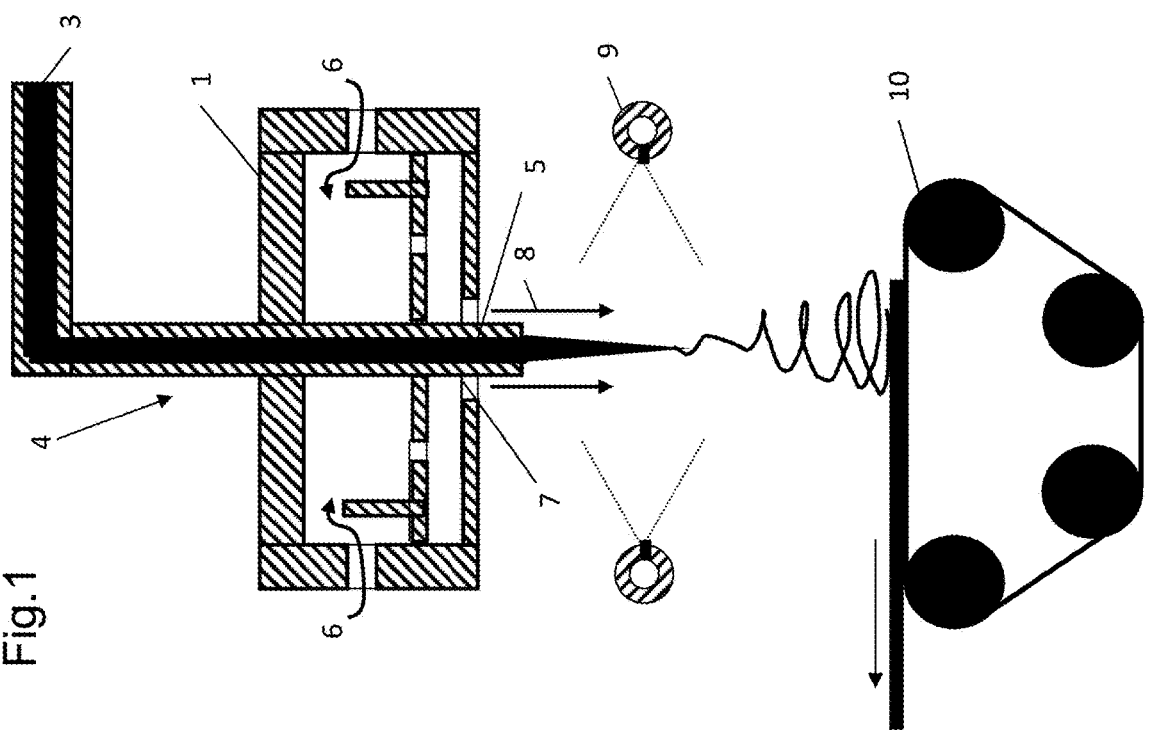
FIG. 2 is a schematic view showing the structure of a melt-blowing facility having a Biax die of multi-row configuration.

FIG. 1 shows a schematic view of a melt-blowing facility having a single-row Biax die 1, i.e. the Biax-type orifices are arranged in a row across the width of the die. FIG. 2 shows an analogous arrangement having a multirow Biax die 2.

As is evident from FIGS. 1 and 2, a molten polymer 3 is supplied to the die by means of a polymer feed line 4 and exits again at the end of the duct 5. In addition, hot compressed air 6 is supplied to the Biax-type orifices and exits again as high-speed blowing air 8 at the outlet 7. The exiting polymer 3 is caught up by the high-speed blowing air 8, causing the polymer threads formed from the exiting polymer 3 to be attenuated. Directly after the polymer threads have exited from the ducts 5, they are sprayed by means of spraying means 9 with a sufficient amount of water to cause electrostatic charging (hydrocharging). The polymer fibres are subsequently deposited on the collecting belt 10.

Figure 3:
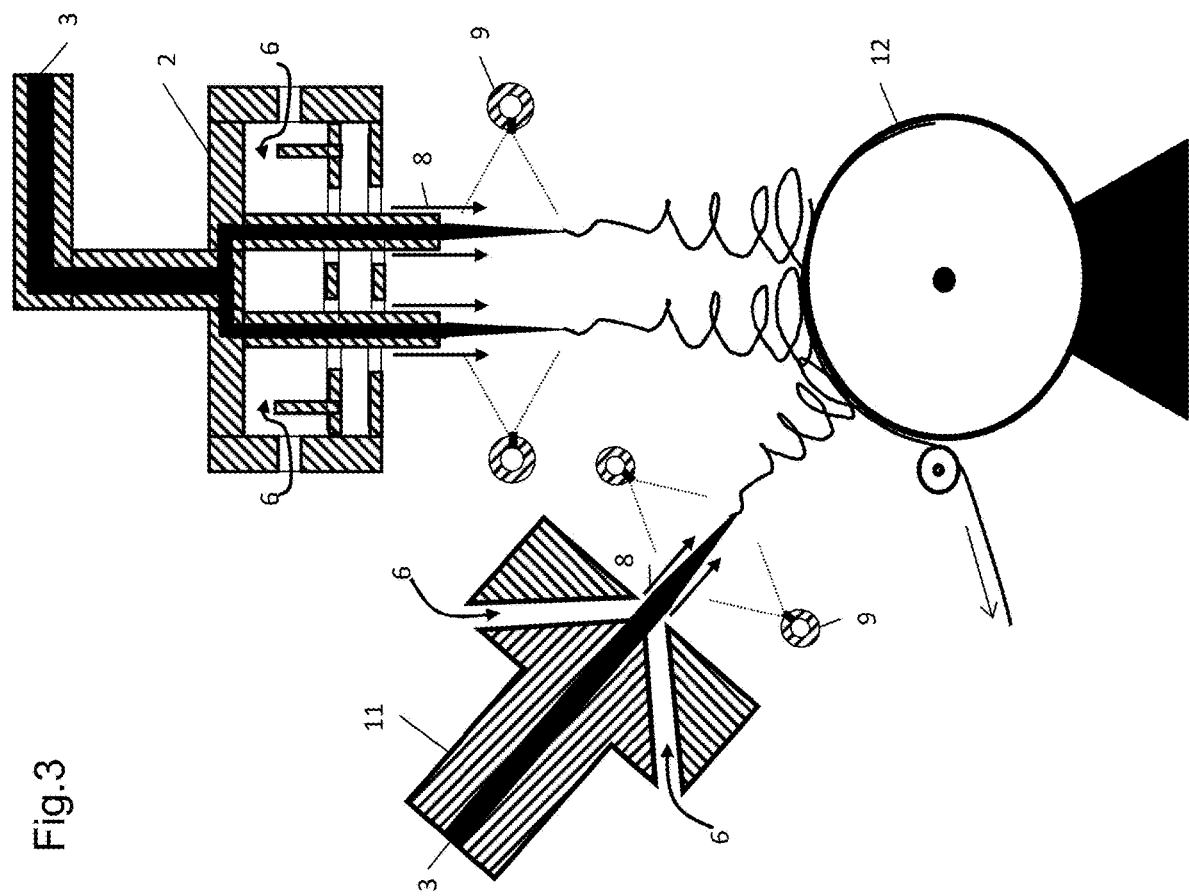
FIG. 3 is a schematic view showing the structure of a melt-blowing facility with a die arrangement consisting of one Exxon and one Biax die.

FIG. 3 shows a melt-blowing facility having a die arrangement consisting of a multirow Biax die 2 and an Exxon die 11. Here, the two fibre types produced are deposited on a collecting drum 12. FIG. 4 shows a similar melt-blowing facility but with two multirow Biax dies 2. The facility also includes a Rando Webber 13, with which short-cut fibres 14 may be added to the produced fibres prior to deposition on the transport belt. Instead of the Rando Webber 13, it is also possible to blend in particles via a strewing trough or chute.

FIG. 5 shows a facility in which the finer fibres are produced by means of a solution-blowing process. In this case, a polymer solution 15 is used instead of a polymer melt 3 to produce the fibres.

Figure 7:
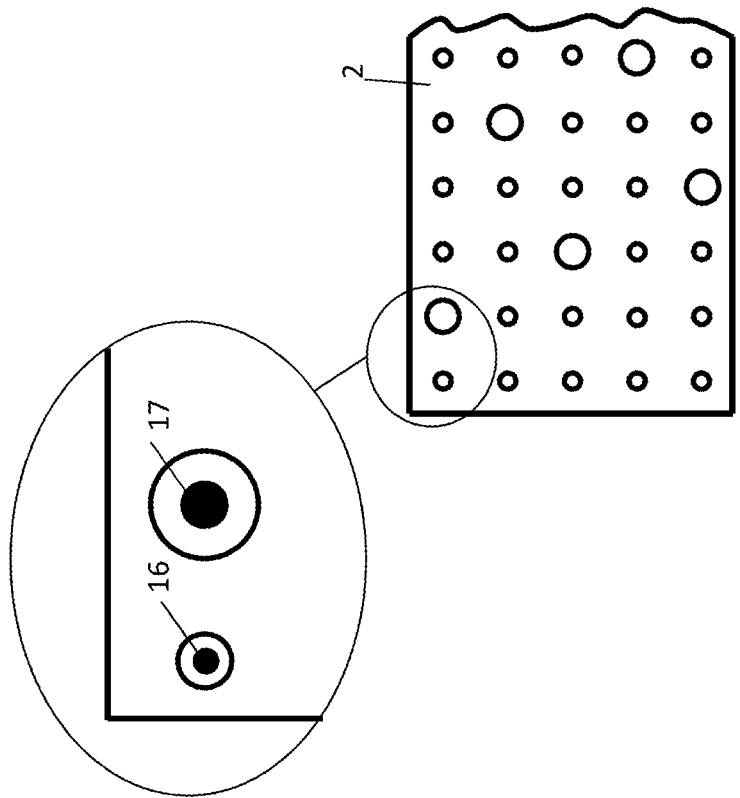
FIG. 7 shows a Biax die having two different kinds of concentric orifices, which have different capillary and/or orifice duct and/or air outlet diameters.
Figure 6:
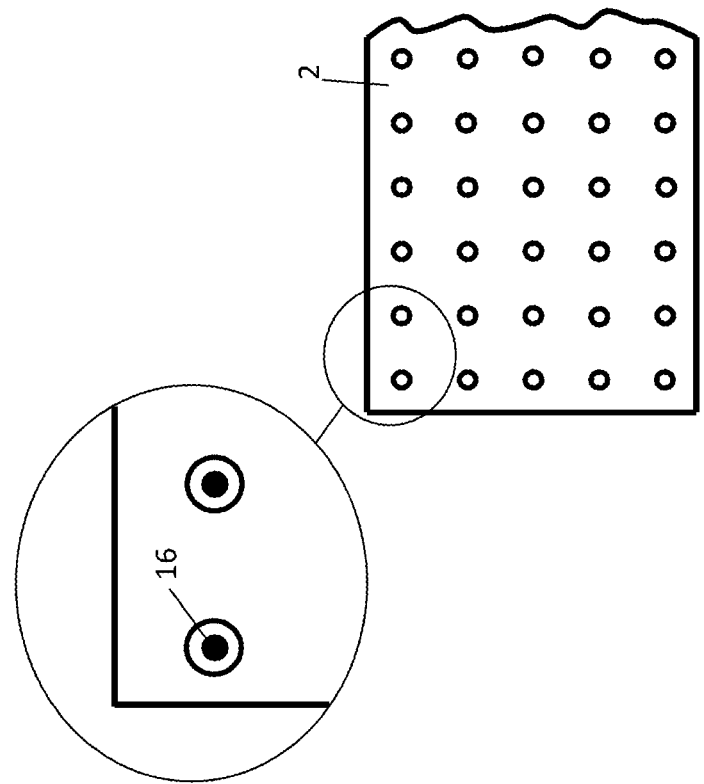
FIG. 6 shows a Biax die having one kind of concentric orifices, which have identical capillary diameters.

FIG. 6 shows a multirow Biax die 2 from the side from which the polymer exits. The die has equal-sized Biax orifice ducts 16 with capillaries, whereas FIG. 7 shows a multirow Biax die 2 which has smaller Biax orifice ducts 16 with capillaries and larger Biax orifice ducts 17 (with capillaries).

Figure 8:
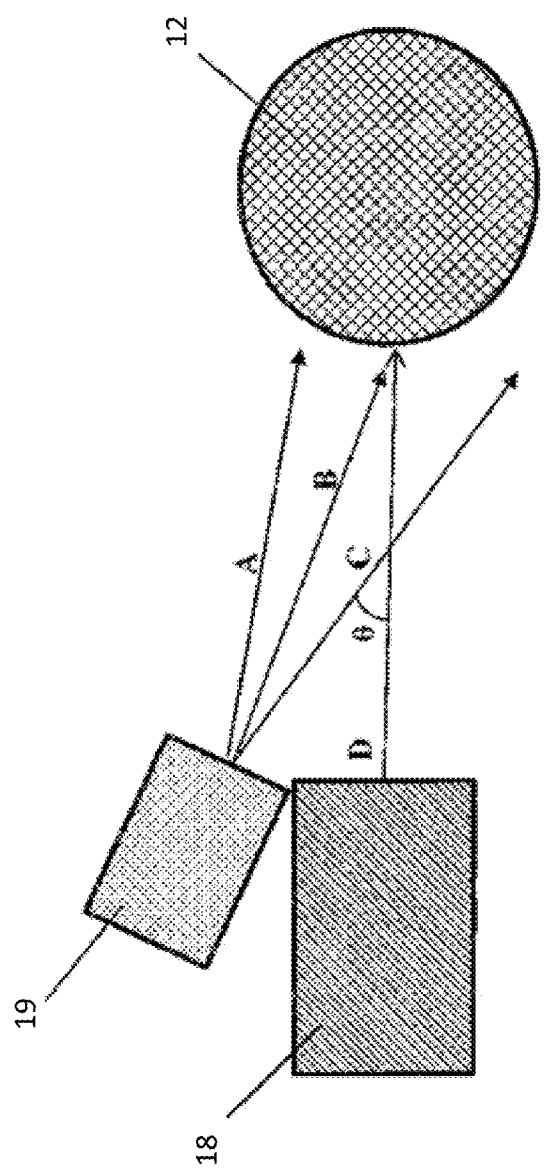
FIG. 8 is a schematic view showing the geometry of a melt-blowing facility having two dies.
Figure 10:
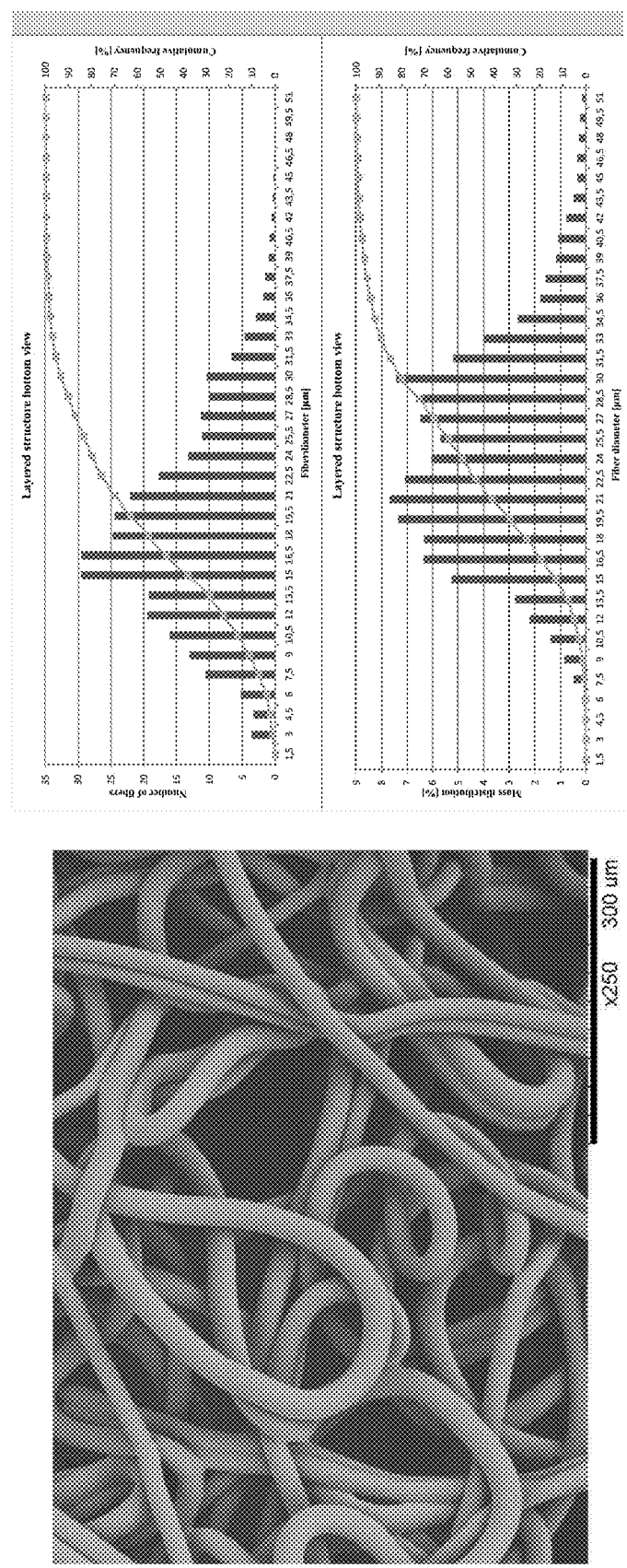
FIG. 10 shows a SEM image and the corresponding fibre distributions of the bottom side of a layered fibrous fleece.
Figure 12:
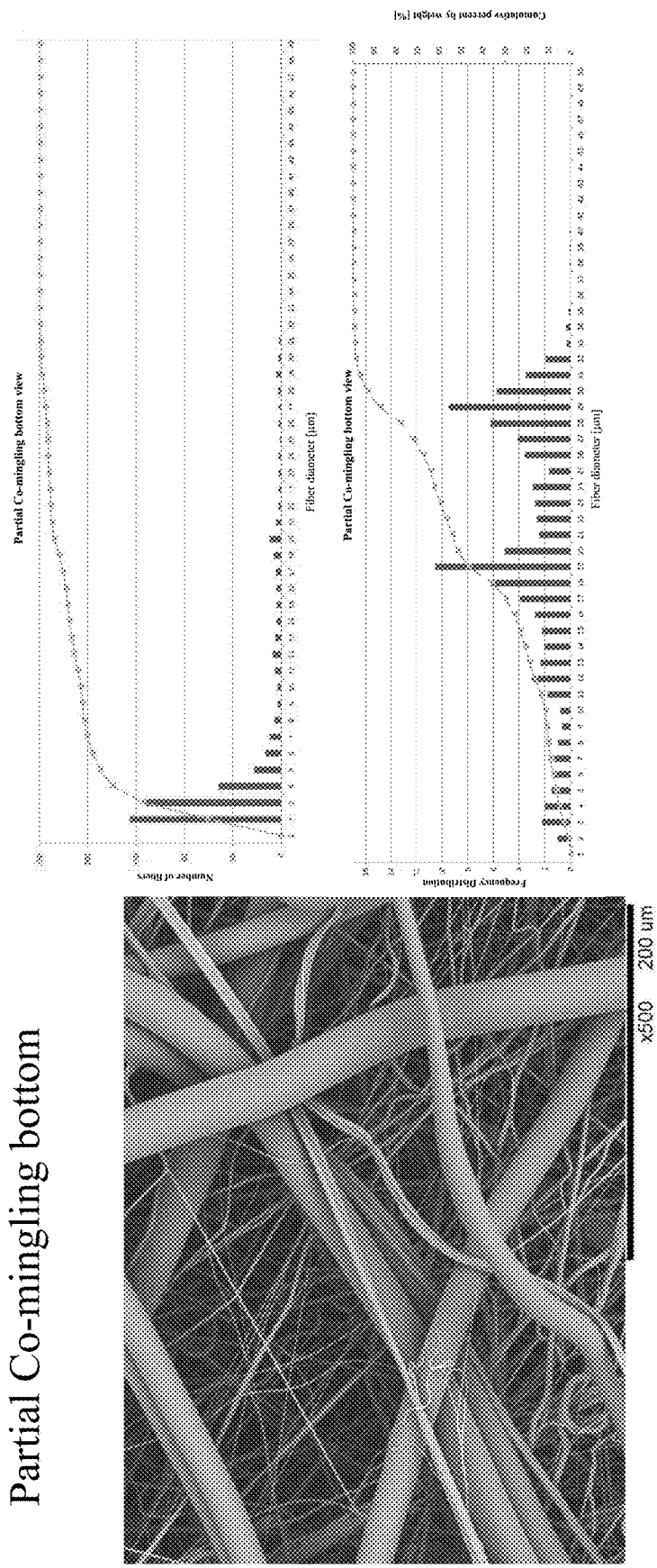
FIG. 12 shows a SEM image and the corresponding fibre distributions of the bottom side of a fibrous nonwoven having partial co-mingling.

FIG. 8 is a schematic illustration of how the geometry of a melt-blowing facility having a first die 18 and a second die 19 may be adjusted. In the experiments described below, in order to selectively adjust the layered structure of the fibrous webs produced with the facility, the first step was to tilt the axis A, B or C of the second die 19 by an angle θ relative to the axis D of the first die 18 and/or to vary the distance between the first die 18 and the collecting drum 12. The tilt angle is typically 15° to 60°. In a second step, the length of the axis D, i.e. the distance between the first die 18 and the collecting drum 12, was varied. In order to obtain high-quality fibrous fleeces, the diameters of the orifice capillaries as well as the number of orifices, the polymer throughput in each case and the amount of high-speed blowing air must be selected such that a sufficient number of fine and coarse fibres are spun and, simultaneously, a nonwoven web is produced which is as homogeneous as possible.

Figure 13:
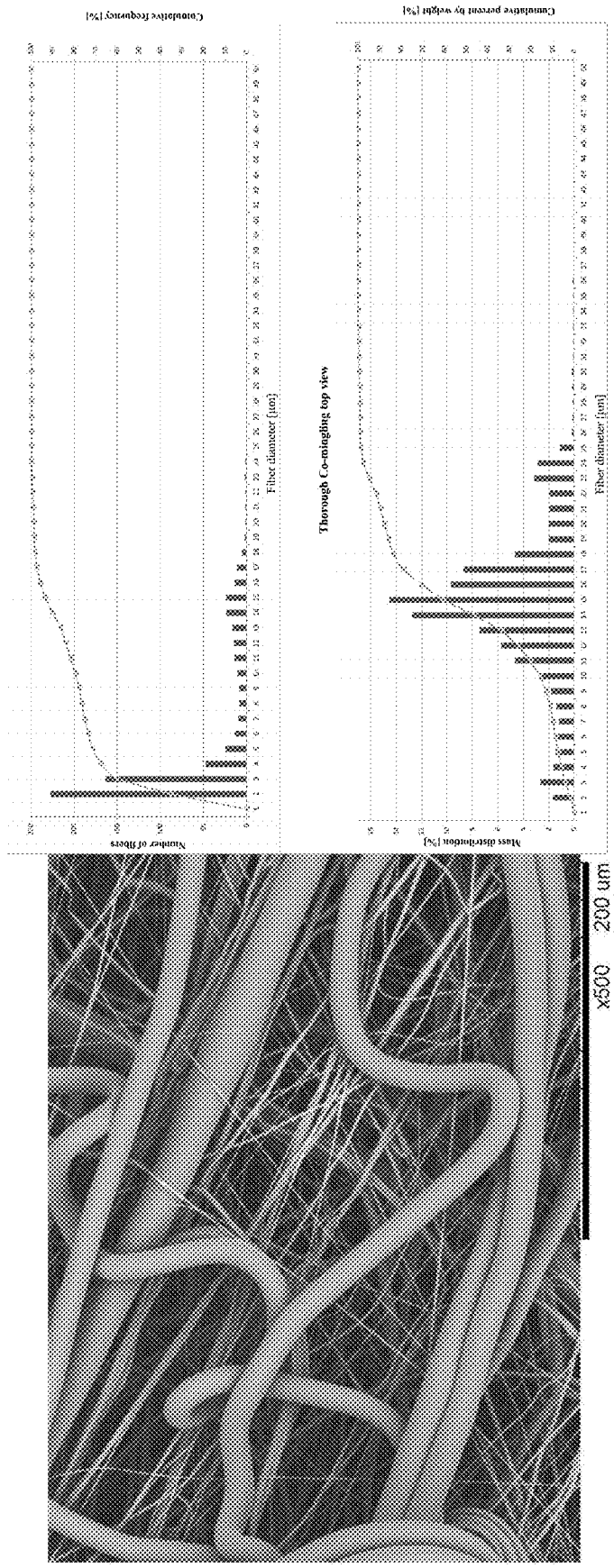
FIG. 13 shows a SEM image and the corresponding fibre distributions of the top side of a fibrous fleece having thorough co-mingling.
Figure 14:
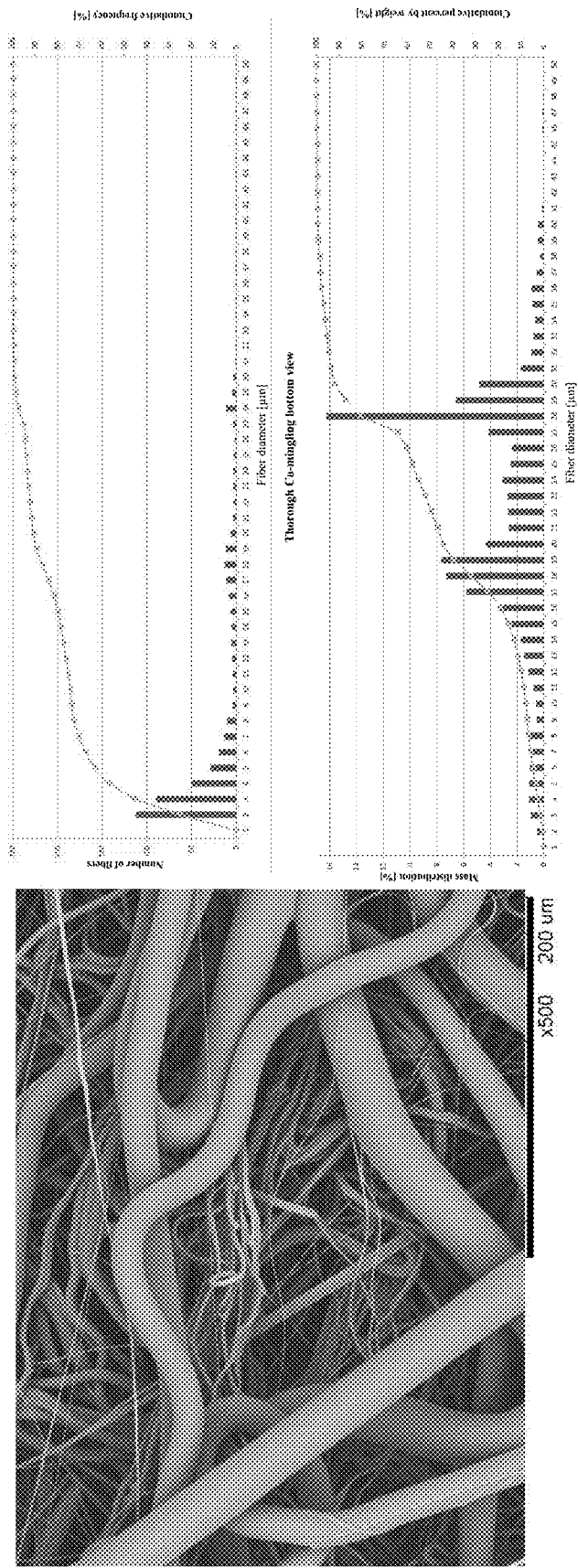
FIG. 14 shows a SEM image and the corresponding fibre distributions of the bottom side of a fibrous nonwoven having thorough co-mingling.

Suitable parameter selection will generally enable the production of a fibrous web with a layered structure, with partial co-mingling (gradient structure) of the two fibre types or with thorough co-mingling (largely homogeneous with only little gradient structure) of the two fibre types. FIGS. 9 to 14 each show a SEM image and the corresponding fibre distributions. FIG. 9 shows the top side of a web with a layered structure and FIG. 10 the bottom side. FIG. 11 shows the top side of a web having partial co-mingling and FIG. 12 the bottom side. FIG. 13 shows the top side of a web having thorough co-mingling and FIG. 14 the bottom side.

Experiment: A series of tests was performed to investigate the influence both of the structure of the fibrous web and of the electrostatically charged fibres in the particular fibrous web on the filtration properties. To start with, the additives Crodamide EBS and Chimasorb 944 were melted on a 1:1 basis and added in sufficient quantities, preferably by way of co-extrusion, to the polymer melt. The melt was then mixed well.

During the production of the web having electrostatically charged fibres and each weighing approx. 50 g/m$^2$, the two fibre jets produced by the respective dies were sprayed from both sides with a sufficient amount of water before the two jets met, thereby intensively charging the fibres contained in the fibre jets.

The fibrous fleeces produced in this way were subsequently measured using a TSI Model 8130 filter tester at a flow-through speed of 0.1 m/s, using a 2% NaCl solution. The results are shown in the following two tables.

| Sample | Process parameter | Temp. of high-speed blowing air ° C. | Orifice temp. | Polymer | Extruder temp. | DCD mm |
|---|---|---|---|---|---|---|
| Layered | 1. Biax die (64) | 240° C. | 230° C. | LyondellBasell Metocene MF650W | 220° C. | 300 |
| Layered | 2. Biax dies (62) | 290° C. | 250° C. | LyondellBasell Metocene MF650X | 250° C. | 200 |
| Partial mixing | 1. Biax die (64) | 240° C. | 230° C. | LyondellBasell Metocene MF650W | 220° C. | 280 |
| Partial mixing | 2. Biax dies (62) | 290° C. | 250° C. | LyondellBasell Metocene MF650X | 250° C. | 380 |
| Thorough mixing | 1. Biax die (64) | 235° C. | 230° C. | LyondellBasell Metocene MF650W | 220° C. | 300 |
| Thorough mixing | 2. Biax dies (62) | 290° C. | 250° C. | LyondellBasell Metocene MF650X | 250° C. | 380 |

| | | Pressure drop [mmH$_2$O] | Penetration [%] | Efficiency [%] | QF [1/mmH$_2$O] |
|---|---|---|---|---|---|
| Layered | Untreated | 3.1 | 77.3 | 22.7 | 0.08 |
| Layered | With additive and water quench | 2.5 | 23.2 | 76.8 | 0.58 |
| Partial mixing | Untreated | 3.2 | 69.4 | 30.6 | 0.11 |
| Partial mixing | With additive and water quench | 2.5 | 5.4 | 94.6 | 1.19 |
| Thorough mixing | Untreated | 2.9 | 79.2 | 20.8 | 0.08 |
| Thorough mixing | With additive and water quench | 2.3 | 15.3 | 84.7 | 0.82 |

Surprisingly, it was found that the fibrous web with partial co-mingling and electrostatically charged fibres showed much higher quality factors QF.

| List of reference numerals | |
|---|---|
| 1 | Biax single-row die |
| 2 | Biax multirow die |
| 3 | Polymer |
| 4 | Polymer feed line |
| 5 | Duct with capillaries |
| 6 | Hot compressed air |
| 7 | Outlet for high-speed blowing air |
| 8 | High-speed blowing air |
| 9 | Spraying device |
| 10 | Collecting belt |
| 11 | Exxon die |
| 12 | Collecting drum |
| 13 | Rando Webber |
| 14 | Short-cut fibres |
| 15 | Polymer solution |
| 16 | Smaller Biax orifice ducts with capillaries |
| 17 | Larger Biax orifice ducts with capillaries |
| 18 | First die |
| 19 | Second die |
| A, B, C | Axes of the second die |
| D | Axis of the first die |
| q | Tilt angle between the axis of the first die and the axes of the second die |

The invention claimed is:

1. A method for producing a pleatable textile object having electrostatically charged fibres, comprising:
   using a die arrangement comprising at least separate first and second dies, wherein at least the first die has concentric orifices,
   extruding a first polymer to fibres of a first fibre type using the first die with a meltblown spinning process,
   extruding a second polymer to fibres of a second fibre type using the second die with a meltblown spinning process,
   spinning the fibres of the first and of the second fibre type such that the average of the fibre diameter of the first fibre type is larger than 10 microns, whereas the fibres of the first fibre type have a larger average fibre diameter than the fibres of the second fibre type,
   mixing the fibres of the first fibre type with the fibres of the second fibre type, at least in sections, at least one of before and during shaping of the textile object with the aid of a collecting device,
   treating at least one of the fibres of the first fibre type and the fibres of the second fibre type with a polar liquid during at least one of fibre formation and drawing, thereby charging the fibres electrostatically;
   one of before and during shaping of the textile object, mixing the fibres of the first fibre type with the fibres of the second fibre type in such a way that, at least in a partial volume of the textile object, the proportion of fibres of the first fibre type and of fibres of the second fibre type show a gradient over a cross section of the textile object; and
   orienting the gradient such that the proportion of fibres of the first fibre type relative to the fibres of the second fibre type is higher at an upstream flow side of the textile object and the proportion of fibres of the second fibre type relative to the fibres of the first fibre type is higher at a downstream flow side thereof.

2. The method according to claim 1, further comprising charging both the fibres of the first fibre type and the fibres of the second fibre type electrostatically using the polar liquid.

3. The method according to claim 1, further comprising using water as the polar liquid for electrostatic charging.

4. The method according to claim 1, further comprising at least one of before and during shaping of the textile object, mixing the fibres of the first fibre type with the fibres of the second fibre type in such a way that, in at least 50% of the volume of the textile object, the proportions of fibres of the first fibre type and of fibres of the second fibre type show a gradient.

5. The method according to claim 1, further comprising using the first polymer for producing fibres of the first fibre type having a melt flow index of less than 800.

6. The method according to claim 1, further comprising using the second die having concentric orifices for the production of fibres of the second fibre type and using the second polymer having a melt flow index of less than 2000.

7. The method according to claim 1, wherein the second die used for the production of fibres of the second fibre type has Exxon-type orifices, and the second polymer has a melt flow index greater than 300.

8. The method according to claim 1, wherein the first polymer comprises at least one of polypropylene, polyethylene, polycarbonate, polylactide, polyamide, polybutylene terephthalate, polyethylene terephthalate, or polyvinylidene fluoride.

9. The method according to claim 1, wherein at least one of the first polymer and the second polymer contains at least one additive able to bind free radicals.

10. The method according to claim 1, wherein at least one of the first polymer and the second polymer contains at least one additive able to act as an internal slip agent.

11. The method according to claim 1, further comprising adding super-fine fibres having an average fibre diameter of less than 1 μm to the fibres of the first fibre type and to the fibres of the second fibre type at least one of before and during shaping of the textile object using the collecting device.

* * * * *